(12) United States Patent
Smith et al.

(10) Patent No.: US 9,309,454 B2
(45) Date of Patent: Apr. 12, 2016

(54) USE OF EXPANDABLE SELF-REMOVING FILLER MATERIAL IN FRACTURING OPERATIONS

(75) Inventors: Jonathan Paul Smith, Katy, TX (US); Jonathan Worley, Lafayette, LA (US); Dave B. Allison, Duncan, OK (US); Kembe Dane Kleinwolterink, Pearland, TX (US); Philip D. Nguyen, Houston, TX (US); Tingji Tang, Spring, TX (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 329 days.

(21) Appl. No.: 13/554,627

(22) Filed: Jul. 20, 2012

(65) Prior Publication Data

US 2014/0020893 A1    Jan. 23, 2014

(51) Int. Cl.
*E21B 43/267* (2006.01)
*C09K 8/62* (2006.01)
*C09K 8/80* (2006.01)

(52) U.S. Cl.
CPC ... *C09K 8/62* (2013.01); *C09K 8/80* (2013.01); *E21B 43/267* (2013.01)

(58) Field of Classification Search
CPC ....... E21B 43/267; C09K 8/80; C09K 8/5045
See application file for complete search history.

(56) References Cited

U.S. PATENT DOCUMENTS

| | | |
|---|---|---|
| 4,585,064 A | 4/1986 | Graham et al. |
| 4,670,501 A | 6/1987 | Dymond et al. |
| 5,249,627 A | 10/1993 | Harms et al. |
| 5,833,000 A | 11/1998 | Weaver et al. |
| 5,839,510 A | 11/1998 | Weaver et al. |
| 5,853,048 A | 12/1998 | Weaver et al. |
| 6,287,639 B1 | 9/2001 | Schmidt et al. |
| 6,311,773 B1 | 11/2001 | Todd et al. |
| 6,439,309 B1 | 8/2002 | Matherly et al. |
| 6,582,819 B2 | 6/2003 | McDaniel et al. |
| 6,677,426 B2 | 1/2004 | Noro et al. |
| 6,997,259 B2 | 2/2006 | Nguyen |
| 7,044,220 B2 | 5/2006 | Nguyen et al. |
| 7,153,575 B2 | 12/2006 | Anderson et al. |
| 7,281,580 B2 | 10/2007 | Parker et al. |
| 7,281,581 B2 | 10/2007 | Nguyen et al. |
| 7,325,608 B2 * | 2/2008 | van Batenburg et al. .. 166/280.1 |
| 7,392,847 B2 | 7/2008 | Gatlin et al. |

(Continued)

FOREIGN PATENT DOCUMENTS

WO    2014014633 A1    1/2014

OTHER PUBLICATIONS

International Search Report and Written Opinion for PCT/US2013/047924 dated Aug. 29, 2013.

*Primary Examiner* — Angela M DiTrani
*Assistant Examiner* — Andrew H Sue-Ako
(74) *Attorney, Agent, or Firm* — McDermott Will & Emery LLP; Craig W. Roddy

(57) ABSTRACT

A method using a propping fluid comprising a first carrier fluid and a plurality of propping agents and a spacer fluid comprising a second carrier fluid and an expandable filler material. The method introduces the propping fluid into a fracture in a subterranean formation and introduces the spacer fluid into the fracture. Then the expandable filler material is exposed to an expanding agent that causes the expandable filler material to expand and press against the adjacent propping agents.

15 Claims, 2 Drawing Sheets

(56) References Cited

U.S. PATENT DOCUMENTS

| | | |
|---|---|---|
| 7,673,686 B2 | 3/2010 | Nguyen et al. |
| 7,819,192 B2 | 10/2010 | Weaver et al. |
| 7,825,074 B2 | 11/2010 | Schmidt et al. |
| 7,956,017 B2 | 6/2011 | Gatlin et al. |
| 8,003,579 B2 | 8/2011 | Akarsu et al. |
| 2005/0059558 A1 | 3/2005 | Blauch et al. |
| 2005/0274517 A1 | 12/2005 | Blauch et al. |
| 2005/0277554 A1 | 12/2005 | Blauch et al. |
| 2006/0113078 A1 | 6/2006 | Nguyen et al. |
| 2007/0131422 A1 | 6/2007 | Gatlin et al. |
| 2007/0131425 A1 | 6/2007 | Gatlin et al. |
| 2007/0289781 A1 | 12/2007 | Rickman et al. |
| 2008/0006405 A1 | 1/2008 | Rickman et al. |
| 2008/0135242 A1* | 6/2008 | Lesko ............... C09K 8/665 166/268 |
| 2009/0044945 A1* | 2/2009 | Willberg ............ C09K 8/706 166/308.1 |
| 2009/0176667 A1* | 7/2009 | Nguyen ............. C09K 8/70 507/204 |
| 2010/0089581 A1 | 4/2010 | Nguyen et al. |
| 2010/0160187 A1 | 6/2010 | Nguyen et al. |
| 2010/0212898 A1 | 8/2010 | Nguyen et al. |
| 2011/0030950 A1 | 2/2011 | Weaver et al. |
| 2011/0036571 A1 | 2/2011 | Vitalievich et al. |
| 2011/0039737 A1 | 2/2011 | Schmidt et al. |
| 2011/0067868 A1 | 3/2011 | Le Roy-Delage et al. |
| 2011/0303411 A1 | 12/2011 | Todd et al. |

* cited by examiner

USE OF EXPANDABLE SELF-REMOVING FILLER MATERIAL IN FRACTURING OPERATIONS

BACKGROUND

The present invention relates to fracturing operations and, more particularly to, compositions and methods related to proppant placement using an expandable material.

Fracturing (e.g., hydraulic fracturing) is a technique in which fractures are propagated in a subterranean formation by the introduction of a pressurized fluid. Often, fracturing operations are performed for the purpose of extracting certain materials such as petroleum, natural gas, coal seam gas, and the like. Hydraulic fracturing can be used to increase or restore the rate at which such materials can be produced from a subterranean formation.

In a typical hydraulic fracturing operation, a proppant (also known in the art as a "propping agent") is suspended in a portion of a treatment fluid, which may then be transported and deposited in fractures within the subterranean formation. The proppant serves to prevent the fractures from fully closing so that conductive channels are formed through which produced hydrocarbons can flow. The degree of success of a fracturing operation depends, at least in part, upon the resultant fracture porosity and conductivity once the fracturing operation is stopped and production is begun. Typical hydraulic fracturing operations place a large volume of suspended proppants into a fracture to form a relatively homogeneous proppant pack within the fracture. The porosity of the resultant packed, propped fracture is related, at least in part, to the interconnected interstitial spaces between the abutting proppant particulates.

An alternative fracturing approach involves placing a much reduced volume of suspended proppants in a fracture to create a fracture having high porosity, permeability, and/or conductivity. The reduced volume of proppants may be consolidated to form individual aggregate structures that are often referred to as "proppant aggregates" or "proppant pillars." As used herein, the term "proppant aggregates" and related terms, such as "proppant pillars," refers to a group of proppants that remains a coherent body when placed into a fracture. The term "proppant pillar" refers to proppant aggregates that have substantially pillar-like structure or placement within the fracture. The proppant aggregates preferably remain coherent bodies that do not become dispersed into separate proppant particles without application of significant shear.

Achieving a heterogeneous proppant placement, such as a pillar placement, typically involves pumping different types of slurries or fluids in discrete intervals. This can provide higher conductivity fractures than those obtained from conventional treatments, and may increase fracture conductivity and fracture porosity by replacing the standard, homogeneous proppant pack with a heterogeneous proppant pack. In some cases, the slurries contain proppants coated with adhesives, such that the proppants exhibit a sticky or tacky character and have a tendency to cluster or aggregate (i.e., form proppant pillars). Proppant pillars (sometimes referred to as "aggregates," or "posts") are placed at intervals throughout the fracture. These pillars have sufficient strength to hold the fracture partially open under closure stress. The open space between pillars forms a network of interconnected, open channels available for flow of fluids into the wellbore. This results in a significant increase of the effective hydraulic conductivity of the overall fracture.

However, there are issues that limit the usefulness of heterogeneous proppant placement. For example, proppant settling is especially problematic in heterogeneous proppant placement because reduced volumes of proppants are typically used. Proppant settling may lead to closure of a portion of the fracture (typically the top portion), which can lower the conductivity of the propped fracture and result in proppant aggregation rather than the desired discrete pillars. Moreover, one of the main technical challenges of heterogeneous proppant placement is the aggregation or formation of proppant pillars from individual proppants and/or proppant clusters.

SUMMARY OF THE INVENTION

The present invention relates to fracturing operations and, more particularly to, compositions and methods related to proppant placement using an expandable material.

In some embodiments, the present invention provides a method comprising: a) providing a propping fluid comprising a carrier fluid and a plurality of propping agents; and a spacer fluid comprising an expandable filler material; b) introducing the propping fluid into a fracture in a subterranean formation; c) introducing the spacer fluid into the fracture and allowing the expandable filler material to expand, wherein an expansion of the expandable filler material packs the propping agents into at least one proppant aggregate; and d) repeating b) and c).

In other embodiments, the present invention provides a method comprising: a) introducing a fracturing fluid in a subterranean formation at a pressure sufficient to create or enhance at least a portion of a fracture; b) introducing a propping fluid comprising a carrier fluid and a plurality of propping agents into the fracture; and an adhesive; c) introducing a spacer fluid comprising an expandable filler material into the fracture, wherein an expansion of the expandable filler material packs the propping agent into at least one proppant aggregate; and d) repeating b) and c).

In still other embodiments, the present invention provides a method comprising: a) providing a fracturing fluid; a propping fluid comprising a carrier fluid, a polymeric viscosifying agent, and a plurality of propping agents; and a spacer fluid comprising an expandable filler material; b) introducing the fracturing fluid into a subterranean formation at a pressure sufficient to create or enhance at least a portion of a fracture; c) introducing the propping fluid into the fracture; d) introducing the spacer fluid into the fracture, wherein an expansion of the expandable filler material packs the propping agent into at least one proppant aggregate; e) repeating c) and d); f) allowing the expandable filler material to degrade; and g) removing the expandable filler material from the subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to fracturing operations and, more particularly to, compositions and methods related to proppant placement using an expandable material.

The present invention provides an expandable filler material useful in heterogeneous proppant placement during a hydraulic fracturing operation. As used herein, the term "expandable" generally refers to the ability of a material to increase in, for example, size and/or volume. In some embodiments, the expandable filler material may expand by, for example, by contact with an expanding agent such as water and/or other fluids. In other embodiments, the expandable filler material may expand by, for example, undergoing a chemical reaction or being exposed to heat.

The expansion of the expandable filler material during heterogeneous proppant placement can also hinder undesirable proppant settling. This expansion will be described in more detail below. As used herein, "settling" and related terms (e.g., "sagging") refers to the phenomena of suspended particles falling out of suspension in liquid. Particulate settling can be a significant problem in heterogeneous proppant placement.

In some embodiments, the present invention provides an expandable filler material that can be placed in a fracture. It is preferable that the expandable filler material is placed in the open spaces between proppant clusters that form during heterogeneous proppant placement. As used herein, the term "proppant cluster" refers to an aggregation of proppants (or of proppant aggregates). Where the "proppant cluster" is surrounded by open space (rather than abutting other proppants or aggregates) and is of sufficient size and strength to hold open a portion of a fracture under closure stress, that cluster may be considered a "proppant pillar."

This placement of the expandable filler material may be achieved by placing a spacer fluid of the present invention further into the formation from the wellbore and/or higher in the fracture (i.e., closer to the Earth's surface) relative to the placement of a propping fluid (which contains proppants, proppant clusters, or aggregates) within the fracture. In some preferred embodiments, it is preferable that the spacer fluid and the propping fluid are miscible so that the expandable filler material may freely fill the open space between proppant clusters. In other embodiments, the spacer fluid and the propping fluid may be immiscible. In some embodiments, the present invention may provide repeated alternating placements (herein referred to as a "fluid train") of propping fluid and spacer fluid within the fracture.

Figure 1:
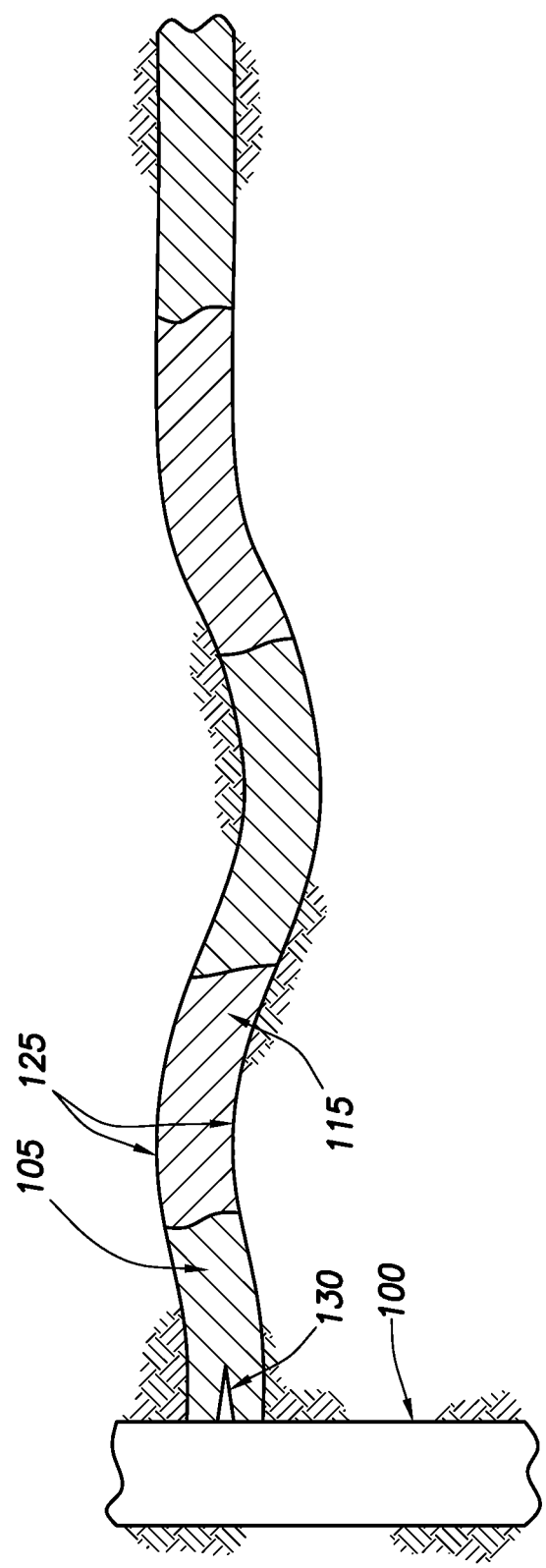
FIG. 1 schematically illustrates placement of subterranean treatment fluids according to one or more embodiments.

FIG. 1 schematically illustrates an embodiment of the present invention according to some embodiments. As shown, a fracture defined by fracture walls 125 is fluidically connected to a wellbore (which may be cased or uncased) 100 through perforation or perforations 130. In at least one aspect of the present invention, the fluid train comprises propping fluid 105 and spacer fluid 115 alternately placed within the fracture. It should be appreciated that FIG. 1 conceptually represents how the treatment fluids may be introduced into a fracture. In other words, the propping fluids and spacer fluids are introduced as discrete portions or volumes, at least initially, into the fracture. In no way should FIG. 1 be considered limiting or representative of a snapshot of an actual fluid train.

The expandable filler material can expand against the proppants placed within the fracture to at least partially pack or consolidate proppant particles in order to form proppant aggregates, proppant pillars, etc. In some preferred embodiments, it is desirable that the proppant-carrying portions of the fluid train become completely surrounded by the spacer fluid which contains the expandable filler material. Thus, when the surrounding expandable filler material expands outward, it pushes inward on the proppants/aggregates and can help to confine and consolidate the proppants/aggregates into proppant clusters. In one or more embodiments, the present invention may provide superior consolidation of proppants compared to conventional fracturing methods. Tackifying or consolidating agents can also be used to help bind the proppants/aggregates together to make high strength proppant clusters.

Figure 2:
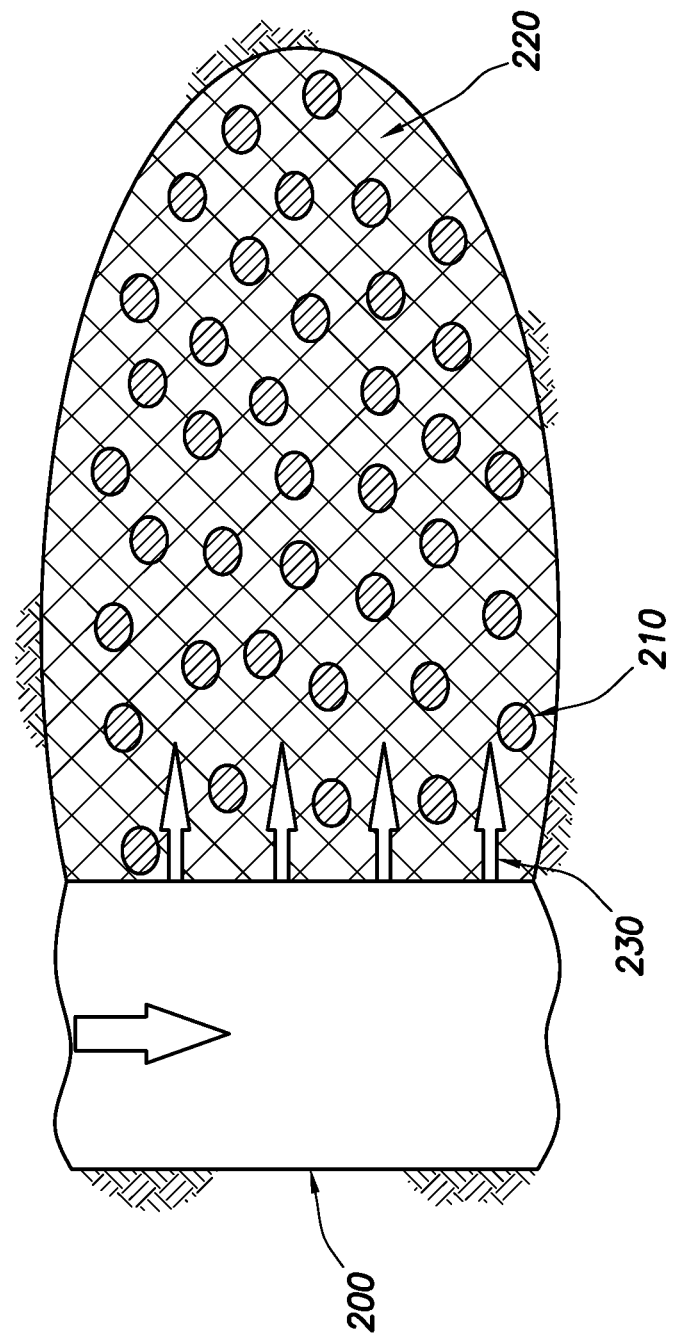
FIG. 2 schematically illustrates arrangement of proppant pillars in a fracture according to one or more embodiments.

FIG. 2 schematically illustrates an aspect of proppant pillar formation according to one or more embodiments. In the embodiment shown, the proppant/aggregates 210 and the expandable filler material 220 were initially introduced as part of treatment fluids (propping fluids and spacer fluids) into the fracture through the wellbore (which may be cased or uncased) 200 and the perforation or perforations 230. The proppant/aggregate 210 and the expandable filler material 220 were allowed to mix such that the expandable filler material 220 surrounds the proppant/aggregates 210. After mixing, the expandable filler material 220 is then allowed to expand, thereby further pushing together the surrounded proppant/aggregates to form proppant pillars as shown.

Before the fracture is used to produce fluids from the formation it is desirable to remove the expandable filler material as much as possible. In some embodiments it may be desirable to remove 100%, at least 95%, at least 90%, or at least 85% of the expandable filler material once the proppant placement and expansion is complete. Thus, the expandable filler material acts as a temporary material that leaves behind a proppant pack with void spaces through which hydrocarbons can flow. This volume of void space can be significantly higher than the volume of void space that results from conventional proppant placement methods. Consequently, the present invention may provide a high porosity fracture that allows for increased rate of production when compared to convention fracturing methods.

As used herein, a "high porosity fracture" refers to a fracture that exhibits a porosity of greater than about 40%, after the fracturing pressure is released and the fracture has closed. In such operations, the proppant aggregates within the fracture may be widely spaced, but they are still sufficient in strength and number to hold the fracture open and allow for production. Such operations allow for increased fracture conductivity due, at least in part, to the fact that the produced fluids may flow around widely spaced proppant particulates rather than just through the relatively small interstitial spaces in a packed proppant bed. In some embodiments, the methods of the present invention may yield a fracture conductivity greater than about: 42%, 45%, 47%, 50%, 52%, 55%, 60%, or 65%.

Some embodiments provide methods comprising: a) providing a propping fluid comprising a first carrier fluid and propping agents; and a spacer fluid comprising a second carrier fluid and an expandable filler material; b) introducing the propping fluid into a fracture in a subterranean formation; c) introducing the spacer fluid into the fracture; and, d) exposing the expandable filler material to an expanding agent that causes the expandable filler material to expand and press against the adjacent propping agents. In some embodiments, steps b) and c) may be repeated one or more times before step d) is performed.

As noted above, the methods preferably also comprise allowing the expandable filler material to degrade after a period of time. The degradation products from the expandable filler material may be removed from the fracture and formation as part of the methods of the present invention or may simply be produced back through the wellbore along with desired production fluids.

In some embodiments, the propping fluid may further comprise an adhesive. In these embodiments the adhesive may be used as solid particles that are tacky and may or may not cure once placed into the subterranean formation, or may be placed as a liquid adhesive or as an emulsion or invert emulsion, or may be placed into the propping agents as a coating.

In still other embodiments, the propping fluid and the spacer fluid may be combined into a single treatment fluid for placement into the fracture. Where the propping fluid is the first fluid, or the combined treatment fluid (having the propping agents therein), is used to as part of the operation to create a fracture, one of skill in the art will recognize that it may be desirable to at least initiate fracture formation using a solids-free pad fluid.

The propping fluid of the present invention may be introduced into a subterranean formation where it can transport propping agents to a desired placement zone (e.g., a fracture). In some cases, the propping fluid may be introduced into the fracture in relatively low volume increments in order to partially fill the fracture with low volumes of proppants. The exact volume of propping fluid used may depend on a number of factors including, but not limited to, size of the fracture, closure pressure of the fracture, desired conductivity, and the like. It is within the ability of one skilled in the art, with the benefit of this disclosure, to determine the volume of propping fluid to include in the methods of the present invention to achieve the desired results.

The propping fluids of the present invention generally comprise a carrier fluid and propping agents. Optionally, the propping fluids may further comprise consolidating agents, consolidating accelerators, gelling agents, crosslinking agents, breakers, surfactants, biocides, and the like.

The carrier fluid of the present invention may be used to suspend and transport the proppants to the desired placement zone. A variety of carrier fluids can be used. Suitable base fluids for use in conjunction with the present invention may include, but not be limited to, oil-based fluids, aqueous-based fluids, and the like.

Suitable oil-based fluids may include alkanes, olefins, aromatic organic compounds, cyclic alkanes, paraffins, diesel fluids, mineral oils, desulfurized hydrogenated kerosenes, and any combination thereof. Aqueous-based fluids suitable for use in the carrier fluids of the present invention may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the treatment fluids of the present invention. In certain embodiments, the density of the aqueous-based fluid can be adjusted, among other purposes, to provide additional particulate transport and suspension in the treatment fluids used in the methods of the present invention. In certain embodiments, the pH of the aqueous-based fluid may be adjusted (e.g., by a buffer or other pH adjusting agent), among other purposes, to activate a crosslinking agent and/or to reduce the viscosity of the treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

In some cases it may be desirable for the carrier fluids of the present invention to be gelled, gelled and crosslinked, or viscosified with a viscoelastic surfactant. The gelling agent may be present in the treatment fluids useful in the methods of the present invention in an amount sufficient to provide the desired viscosity. In some embodiments, the gelling agents (i.e., the polymeric material) may be present in an amount in the range of from about 0.1% to about 10% by weight of the treatment fluid. In certain embodiments, the gelling agents may be present in an amount in the range of from about 0.15% to about 2.5% by weight of the treatment fluid. In those embodiments of the present invention where it is desirable to crosslink the gelling agent, the first treatment fluid (e.g., propping fluid) and/or second treatment fluid (e.g., spacer fluid) may comprise one or more crosslinking agents. When included, suitable crosslinking agents may be present in the treatment fluids useful in the methods of the present invention in an amount sufficient to provide the desired degree of crosslinking between molecules of the gelling agent. In certain embodiments, the crosslinking agent may be present in the first treatment fluids and/or second treatment fluids of the present invention in an amount in the range of from about 0.005% to about 1% by weight of the treatment fluid. One of skill in the art will be able to select gelling agents and/or crosslinking agents appropriate to the subterranean formation being treated and the operation being performed.

Propping agents suitable for use in the present invention include proppants, and solids-laden gel bodies, and proppant aggregates. Proppant particulates suitable for use in the methods of the present invention may be of any size and shape combination known in the art as suitable for use in a fracturing operation. In some embodiments, the proppants are engineered to be of a specific volume or size to carry out its desired function. In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular shaped, rod shaped, ellipse shaped, cone shaped, pyramid shaped, or cylinder shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. By so resisting settling, substantially non-spherical proppant particulates may provide improved proppant particulate distribution as compared to more spherical proppant particulates.

Proppants suitable for use in the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In certain embodiments, the particulates may be present in the treatment fluids of the present invention in an amount in the range of from about 0.1 pounds per gallon ("ppg") to about 24 ppg by volume of the treatment fluid. In some embodiments, the particulates may be present in the treatment fluids of the present invention in an amount up to about 30 ppg by volume of the treatment fluid.

Gel bodies suitable for use to creating solids-laden gel bodies for use as propping agents in the present invention include those described in U.S. Patent Application Publication No. 2010/0089581, the entire disclosure of which is hereby incorporated by reference. In addition, the super-absorbent polymer discussed in U.S. Patent Application Publication No. 2011/0067868, the entire disclosure of which is hereby incorporated by reference, may also be suitable for use as gel bodies in the present invention. For use as propping agents in the present invention, the gel bodies further comprise solid particles, such as those solids suggested above as suitable proppants. It is preferable that the gel bodies do not degrade once placed within the subterranean formation. That is, while some degradation may occur, it is preferable that the gel bodies remain substantially intact such that the solids remain locked therein.

Adhesives suitable for use in the methods of the present invention generally comprise, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, and binders. Combinations and/or derivatives of these also may be suitable. Nonlimiting examples of suitable non-aqueous tackifying agents may be found in U.S. Pat. No. 5,853,048 entitled "Control of Fine Particulate Flowback in Subterranean Wells," U.S. Pat. No. 5,839,510 entitled "Control of Particulate Flowback in Subterranean Wells," and U.S. Pat. No. 5,833,000 entitled "Control of Particulate Flowback in Subterranean Wells," and U.S. Patent Application Publication Nos. 2007/0131425 entitled "Aggregating Reagents, Modified Particulate Metal-Oxides, and Methods for Making and Using Same" and 2007/0131422 entitled "Sand Aggregating Reagents, Modified Sands, and Methods for Making and Using Same," the entire disclosures of which are herein incorporated by reference. Nonlimiting examples of suitable aqueous tackifying agents may be found in U.S. Pat. No. 5,249,627 entitled "Method for Stimulating Methane Production from Coal Seams" and U.S. Pat. No. 4,670,501 entitled "Polymeric Compositions and Methods of Using Them," and U.S. Patent Application Publication Nos. 2005/0277554 entitled "Aqueous Tackifier and Methods of Controlling Particulates" and 2005/0274517 entitled "Aqueous-Based Tackifier Fluids and Methods of Use," the entire disclosures of which are herein incorporated by reference. Nonlimiting examples of suitable crosslinkable aqueous polymer compositions may be found in U.S. Patent Application Publication Nos. 2010/0160187 entitled "Methods and Compositions for Stabilizing Unconsolidated Particulates in a Subterranean Formation" and 2011/0030950 entitled "Methods for Controlling Particulate Flowback and Migration in a Subterranean Formation," the entire disclosures of which are herein incorporated by reference. Nonlimiting examples of suitable silyl-modified polyamide compounds may be found in U.S. Pat. No. 6,439,309 entitled "Compositions and Methods for Controlling Particulate Movement in Wellbores and Subterranean Formations," the entire disclosure of which is herein incorporated by reference. Nonlimiting examples of suitable resins may be found in U.S. Pat. No. 7,673,686 entitled "Method of Stabilizing Unconsolidated Formation for Sand Control," U.S. Pat. No. 7,153,575 entitled "Particulate Material Having Multiple Curable Coatings and Methods of Making and Using the Same," U.S. Pat. No. 6,677,426 entitled "Modified Epoxy Resin Composition, Production Process for the Same and Solvent-Free Coating Comprising the Same," U.S. Pat. No. 6,582,819 entitled "Low Density Composite Proppant, Filtration Media, Gravel Packing Media, and Sports Field Media, and Methods for Making and Using Same," U.S. Pat. No. 6,311,773 entitled "Resin Compositions and Methods of Consolidating Particulate Solids in Wells With and Without Closure Pressure," and U.S. Pat. No. 4,585,064 entitled "High Strength Particulates," and U.S. Patent Application Publication Nos. 2010/0212898 entitled "Methods and Compositions for Consolidating Particulate Matter in a Subterranean Formation" and 2008/0006405 entitled "Methods and Compositions for Enhancing Proppant Pack Conductivity and Strength," the entire disclosures of which are herein incorporated by reference. Nonlimiting examples of suitable polymerizable organic monomer compositions may be found in U.S. Pat. No. 7,819,192, entitled "Consolidating Agent Emulsions and Associated Methods," the entire disclosure of which is herein incorporated by reference. Nonlimiting examples of suitable consolidating agent emulsions may be found in U.S. Patent Application Publication No. 2007/0289781 entitled "Consolidating Agents Emulsions and Associated Methods," the entire disclosure of which is herein incorporated by reference. Nonlimiting examples of suitable zeta-potential modifying aggregating compositions may be found in U.S. Pat. No. 7,956,017 entitled "Aggregating Reagents, Modified Particulate Metal-Oxides and Proppants" and U.S. Pat. No. 7,392,847 entitled "Aggregating Reagents, Modified Particulate Metal-Oxides, and Methods for Making and Using Same," the entire disclosures of which are herein incorporated by reference. Nonlimiting examples of suitable binders may be found in U.S. Pat. No. 8,003,579 entitled "Oil-, Hot Water- and Heat-Resistant Binders, Process for Preparing Them and Their Use," U.S. Pat. No. 7,825,074 entitled "Hydrolytically and Hydrothermally Stable Consolidation or Change in the Wetting Behavior of Geological Formations," and U.S. Pat. No. 6,287,639 entitled "Composite Materials," and U.S. Patent Application Publication No. 2011/0039737 entitled "Binder for Binding Beds and Loose Formations and Processes for Producing Them," the entire disclosures of which are herein incorporated by reference. It is within the ability of one skilled in the art, with the benefit of this disclosure, to determine the type and amount of consolidating agent to include in the methods of the present invention to achieve the desired results.

The carrier fluids useful in the methods of the present invention may further include internal gel breakers such as enzyme, oxidizing, acid buffer, or delayed gel breakers. The gel breakers may cause the treatment fluids of the present invention to revert to thin fluids that can be produced back to the surface, for example, after they have been used to place proppant particles in subterranean fractures. In some embodiments, the gel breaker may be formulated to remain inactive until it is "activated" by, among other things, certain conditions in the fluid (e.g., pH, temperature, etc.) and/or interaction with some other substance. In some embodiments, the gel breaker may be delayed by encapsulation with a coating (e.g., porous coatings through which the breaker may diffuse slowly, or a degradable coating that degrades downhole) that delays the release of the gel breaker. In other embodiments the gel breaker may be a degradable material (e.g., polylactic acid or polygylcolic acid) that releases an acid or alcohol in the present of an aqueous liquid. In certain embodiments, the gel breaker used may be present in the first treatment fluid and/or second treatment fluid in an amount in the range of from about 0.0001% to about 200% by weight of the gelling agent. One of ordinary skill in the art, with the benefit of this disclosure, will recognize the type and amount of a gel breaker to include in certain treatment fluids of the present invention based on, among other factors, the desired amount of delay time before the gel breaks, the type of gelling agents used, the temperature conditions of a particular application, the desired rate and degree of viscosity reduction, and/or the pH of the first treatment fluid and/or second treatment fluid.

The spacer fluid of the present invention may be introduced into the subterranean formation in order to transport the expandable filler material to the fracture. The spacer fluid may be introduced into the fracture in relatively low volume increments so that the fracture can alternately receive volumes of propping fluid and spacer fluid. In some embodiments, the propping fluid and the spacer fluid are immiscible. In other embodiments, the propping fluid and the spacer fluid are miscible. In some embodiments, the first carrier fluid used in the propping fluid and the second carrier fluid used in the spacer fluid may be identical. In some embodiments, the propping fluid and the spacer fluid may have different proppant transport capabilities and/or densities. Generally, it is desirable that the propping fluid include superior proppant transport characteristics so as to ensure proper placement of the propping agents into the fracture. However, the spacer fluid may itself contain proppant where desired; typically the proppant concentration in the spacer will be less than that of the propping fluid.

The spacer fluids of the present invention comprise an expandable filler material. Optionally, the spacer fluid further comprises an additive selected from the group consisting of: surfactant, gelling agent, crosslinking agent, breaker, consolidating agent, consolidating accelerator, and any combination thereof.

It is generally desirable to place the spacer fluid such that the expandable filler material can surround proppants, proppant clusters, and/or proppant aggregates (collectively referred to as "proppants") that have been placed within a fracture by a prior placement of the propping fluid. The introduction of the propping fluid into the fracture can transport the proppants into the fracture where they can be distributed within the fracture. Generally, the distribution of the proppants will be designed to maintain the opening of the fracture apertures and yet be sufficiently spaced out to create as much void space as possible for fluids to flow through. The expandable filler material may expand against the proppants suspended in the propping fluid such that the formation of proppant pillars, which can help prop the fracture open, is promoted.

Suitable expandable filler materials include natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, fluoro rubbers, poly 2,2,1-bicyclo heptene, alkylstyrene, crosslinked substituted vinyl acrylate copolymers, and diatomaceous earth. In other embodiments, the expandable filler material is selected from the group consisting of: boric oxide, poly(acrylamide), poly(lactide), poly(glycolide), protein, chitin, cellulose, dextran, poly($\epsilon$-caprolactone), poly(hydroxybutyrate), poly(anhydride), aliphatic polycarbonate, poly(orthoester), poly(amino acid), poly(ethylene oxide), polyphosphazene, derivatives thereof, and combinations thereof. It is generally desirable that the expandable filler material is both expandable and removable from a subterranean formation.

In some embodiments, the expandable filler material may expand only upon contact with an activator. Suitable activation mechanisms include, but are not limited to, swelling upon contact with a fluid, chemical reaction, exposure to heat, and the like. The expansion of the expandable filler material can create a force that acts on the proppants. This force can pack the proppants such that the consolidation of proppants and/or formation of proppant aggregate is achieved or promoted. It is preferable that the expandable filler material is degradable or self-degradable so that void spaces may be left within the fracture after the expandable filler material has expanded. These void spaces can function as conductive pathways for hydrocarbons to flow through. While some expandable filler materials will degrade in the presence of the formation temperature itself or over time in the presence of formation fluids, other filler materials may require a solvent or a catalyst to facilitate the degradation process.

As used herein, the terms "degrade," "degradation," "degradable," and the like refer to a material's tendency to be broken down into simpler components. In some embodiments, a degradable material may be broken down chemically by the addition of another material. As used herein, the term "self-degrade," "self-degradation," "self-degradable," and the like generally refer to the tendency of a composition to degrade over time when placed in a subterranean zone through natural means (e.g., air, light, water, and the like). In some embodiments, the expandable filler material may self-degrade upon exposure to formation conditions (e.g., pressure, temperature, etc.). Degradation may generally take place by any suitable means including, but not limited to, hydrolytic degradation, surface erosion, bulk erosion, and the like. Once degradation has taken place, in some embodiments, the degraded expandable filler material may be removed from the fracture without any further intervention. In some preferred embodiments, the expandable filler material can be degraded to a liquid or a smaller component that is soluble in water or hydrocarbons or both. Once the expandable filler material has degraded and solubilized, it can flow out of the fracture as the formation produces the hydrocarbons. In other embodiments, the expandable filler material can degrade down to a particle that is small (e.g., micro- or nano-scale) enough such that the particle can be carried out of the fracture by the production of hydrocarbon.

In one or more embodiments, the expandable filler material may be pumped at properly timed intervals in an amount sufficient to pack the proppant particles without eventually leading to a proppant pack with small interstitial spaces. The exact amount of expandable filler materials and the duration of the timed intervals may depend on a number of factors including, but not limited to, fracture width and transportation characteristics of the treatment fluid and proppant particles. In some embodiments, these factors may be determined or evaluated by modeling software and/or actual measurements via various means (microseismic, DTS, flowback studies, tracer surveys). Such determinations may allow, for example, to predict the shape of the fracture, where the proppant particles will be as a function of time, and the amount of time necessary for the fracture to close on the proppant. Based on the predictions, the expandable filler material may be introduced into the fracture to counteract settling or conglomeration of the pack for sufficient time.

In one or more embodiments, the expandable filler material may be present in about 0.001% to about 50% by weight of the spacer fluid. In some preferred embodiments, the expandable filler material may be present in about 0.25% to about 25% by weight of the spacer fluid. In an exemplary example, the spacer fluid comprises boric oxide that expands upon contact with an aqueous fluid. Where boric oxide is used, it may tend to generate heat as it degrades, thus providing additional heat to cure an adhesive (such as a thermal set resin) or encourage faster degradation.

To facilitate a better understanding of the present invention, the following examples of preferred or representative embodiments are given. In no way should the following examples be read to limit, or to define, the scope of the invention.

EXAMPLE 1

In this example, the expansion of boric oxide was experimentally observed over time.

Seven graduated cylinders, each containing approximately one milliliter (ml) of boric oxide particles, were observed. The cylinders were labeled: "Retained on 8," "10/12," "12/14," "16/18," "20/30," "30/40," and "40/Pan;" indicating the size of the boric oxide particles in terms of U.S. mesh size. By way of example, particles retained on 8 U.S. mesh will be generally 2.38 mm or greater in size, whereas particles that went past 40 U.S. Mesh to the catch pan below will be smaller than about 0.4 mm. 10 ml of distilled water was added to each graduated cylinder using a syringe at time=0 minutes (min). Upon addition of distilled water, each boric acid sample demonstrated various expansion rates. The extent of expansion was measured (per about 0.25 ml) at approximately 1 min, 2 min, 10 min, and 25 min after addition of water, as represented in Table 1. Table 1 also demonstrates that smaller particles in terms of mesh size tended to activate and/or expand faster than larger particles.

TABLE 1

|  | Retained on 8 | 10/12 | 12/14 | 16/18 | 20/30 | 30/40 | 40/Pan |
|---|---|---|---|---|---|---|---|
| 1 min (ml) | 1.25 | 1.25 | 1.25 | 1.25 | 1.50 | 1.50 | 2.00 |
| 2 min (ml) | 1.25 | 1.25 | 1.25 | 1.50 | 1.50 | 1.75 | 2.00 |
| 10 min (ml) | 1.50 | 1.50 | 1.50 | 1.75 | 2.00 | 2.00 | 2.00 |
| 20 min (ml) | 1.50 | 1.75 | 1.75 | 2.00 | 2.00 | 2.00 | 2.00 |

Table 1 shows that the particles "retained on 8" expanded about 20% (from 1.25 mL to 1.5 mL in volume) and expanded from 1 to 10 minutes but showed no significant additional expansion between 10 and 20 minutes. Whereas the particles test at "16/18" expanded 60% (from 1.25 mL to 2.0 mL in volume) and continued expanding even after 10 minutes had elapsed. The particles labeled "40/Pan," by contrast, expanded a full 60% in the time between 0 and 1 minute.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
   a) providing a propping fluid comprising a first carrier fluid, a thermal set resin, and a plurality of propping agents;
   b) providing a spacer fluid comprising a second carrier fluid and a first expandable filler material, wherein the first expandable filler material is boric oxide and is present in the range of about 0.001% to about 50% by weight of the spacer fluid;

c) introducing the propping fluid into a fracture in a subterranean formation;

d) introducing the spacer fluid into the fracture by introducing the spacer fluid into the subterranean formation at a location higher in the fracture relative to the propping fluid in the fracture;

e) exposing the first expandable filler material to an expanding agent that causes the first expandable filler material to expand and press against adjacent propping agents;

f) allowing the first expandable filler material to degrade, wherein the first expandable filler material generates heat as it degrades, thereby aiding in curing the thermal set resin in the propping fluid and further degrading the first expandable filler material; and g) removing at least 85% of the degraded first expandable filler material from the subterranean formation to achieve a high porosity fracture having a conductivity of greater than about 40%.

2. The method of claim 1 further comprising repeating steps c) and d) one or more times before step f).

3. The method of claim 1 wherein steps c) and d) are performed together such that the propping fluid and spacer fluid are combined into a single treatment fluid comprising propping agents and expandable filler material.

4. The method of claim 1 wherein the propping fluid further comprises an adhesive.

5. The method of claim 1 wherein the propping agent is selected from the group consisting of: a proppant, a solids-laden gel body, and a combination thereof.

6. The method of claim 1, wherein the spacer fluid further comprises a second expandable filler material, the second expandable filler material selected from the group consisting of: poly(acrylamide), poly(lactide), poly(glycolide), protein, chitin, cellulose, dextran, poly($\epsilon$-caprolactone), poly(hydroxybutyrate), poly(anhydride), aliphatic polycarbonate, poly(orthoester), poly(amino acid), poly(ethylene oxide), polyphosphazene, any derivative thereof, and any combination thereof.

7. The method of claim 1, wherein the spacer fluid further comprises a second expandable filler material, the second expandable filler material selected from the group consisting of: natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, fluoro rubbers, poly 2,2,1-bicyclo heptene, alkylstyrene, crosslinked substituted vinyl acrylate copolymers, diatomaceous earth, and any combination thereof.

8. The method of claim 1, wherein the spacer fluid further comprises an additive selected from the group consisting of: surfactant, viscosifier, breaker, consolidating agent, consolidating accelerator, and any combination thereof.

9. A method comprising:

a) introducing a fracturing fluid in a subterranean formation at a pressure sufficient to create or enhance at least a portion of a fracture;

b) providing a spacer fluid comprising a second carrier fluid, a thermal set resin, and a first expandable filler material, wherein the expandable filler material is boric oxide and is present in the range of about 0.001% to about 50% by weight of the spacer fluid;

c) introducing a propping fluid comprising a first carrier fluid and a plurality of propping agents into the fracture;

d) introducing the spacer fluid into the fracture by introducing the spacer fluid into the subterranean formation at a location higher in the fracture relative to the propping fluid in the fracture;

e) exposing the first expandable filler material to an expanding agent that causes the first expandable filler material to expand and press against adjacent propping agents;

f) allowing the first expandable filler material to degrade, wherein the first expandable filler material generates heat as it degrades, thereby aiding in curing the thermal set resin in the propping fluid and further degrading the first expandable filler material; and g) removing at least 85% of the degraded first expandable filler material from the subterranean formation to achieve a high porosity fracture having a conductivity of greater than about 40%.

10. The method of claim 9 further comprising repeating steps c) and d) one or more times before step f).

11. The method of claim 9 wherein steps c) and d) are performed together such that the propping fluid and spacer fluid are combined into a single treatment fluid comprising propping agents and expandable filler material.

12. The method of claim 9 wherein the propping agent is selected from the group consisting of: a proppant, a solids-laden gel body, and a combination thereof.

13. The method of claim 9, wherein the spacer fluid further comprises a second expandable filler material, the second expandable filler material selected from the group consisting of: poly(acrylamide), poly(lactide), poly(glycolide), protein, chitin, cellulose, dextran, poly($\epsilon$-caprolactone), poly(hydroxybutyrate), poly(anhydride), aliphatic polycarbonate, poly(orthoester), poly(amino acid), poly(ethylene oxide), polyphosphazene, any derivative thereof, and any combination thereof.

14. The method of claim 9, wherein the spacer fluid further comprises a second expandable filler material, the second expandable filler material selected from the group consisting of: natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene-propylene rubber, ethylene-propylene-diene terpolymer rubber, ethylene vinyl acetate copolymer, fluorosilicone rubbers, silicone rubbers, fluoro rubbers, poly 2,2,1-bicyclo heptene, alkylstyrene, crosslinked substituted vinyl acrylate copolymers, diatomaceous earth, and any combination thereof.

15. he method of claim 9, wherein the spacer fluid further comprises an additive selected from the group consisting of: surfactant, viscosifier, breaker, consolidating agent, consolidating accelerator, and any combination thereof.

* * * * *